(12) United States Patent
Corbin

(10) Patent No.: US 11,782,465 B2
(45) Date of Patent: Oct. 10, 2023

(54) OPTIMIZATION OF ENERGY USE THROUGH MODEL-BASED SIMULATIONS

(71) Applicant: Tendril OE, LLC, Boulder, CO (US)

(72) Inventor: Charles D. Corbin, Boulder, CO (US)

(73) Assignee: Tendril OE, LLC, Boulder, CO (US)

( * ) Notice: Subject to any disclaimer, the term of this patent is extended or adjusted under 35 U.S.C. 154(b) by 0 days.

(21) Appl. No.: 17/707,929

(22) Filed: Mar. 29, 2022

(65) Prior Publication Data

US 2022/0221885 A1 Jul. 14, 2022

Related U.S. Application Data

(63) Continuation of application No. 16/894,508, filed on Jun. 5, 2020, now Pat. No. 11,385,664, which is a
(Continued)

(51) Int. Cl.
  *G05D 23/19* (2006.01)
  *F24F 130/00* (2018.01)
  (Continued)

(52) U.S. Cl.
  CPC .......... *G05D 23/1923* (2013.01); *F24F 11/63* (2018.01); *F24F 2130/00* (2018.01); *F24F 2130/10* (2018.01)

(58) Field of Classification Search
  CPC .. G05D 23/1923; F24F 11/63; F24F 2130/00; F24F 2130/10
  See application file for complete search history.

(56) References Cited

U.S. PATENT DOCUMENTS

| | | |
|---|---|---|
| 4,042,013 A | 8/1977 | Demaray et al. |
| 4,401,943 A | 8/1983 | Morris |
| | (Continued) | |

FOREIGN PATENT DOCUMENTS

| | | |
|---|---|---|
| WO | 0074306 | 12/2000 |
| WO | 2012068503 A1 | 5/2012 |
| WO | 2014085777 A1 | 6/2014 |

OTHER PUBLICATIONS

Ahmad et al. "Computational intelligence techniques for HVAC systems: A review." Building Simulation, Tsinghua University Press, vol. 9, No. 4, Mar. 31, 2016, pp. 359-398.
(Continued)

*Primary Examiner* — Tejal Gami
(74) *Attorney, Agent, or Firm* — Perkins Coie LLP

(57) ABSTRACT

A facility implementing systems and/or methods for achieving energy consumption/production and cost goals is described. The facility identifies various components of an energy system and assesses the environment in which those components operate. Based on the identified components and assessments, the facility generates a model to simulate different series/schedules of adjustments to the system and how those adjustments will effect energy consumption or production. Using the model, and based on identified patterns, preferences, and forecasted weather conditions, the facility can identify an optimal series or schedule of adjustments to achieve the user's goals and provide the schedule to the system for implementation. The model may be constructed using a time-series of energy consumption and thermostat states to estimate parameters and algorithms of the system. Using the model, the facility can simulate the behavior of the system and, by changing simulated inputs and measuring simulated output, optimize use of the system.

11 Claims, 5 Drawing Sheets

Related U.S. Application Data continuation of application No. 13/564,623, filed on Aug. 1, 2012, now Pat. No. 10,678,279.

(51) Int. Cl.
*F24F 130/10* (2018.01)
*F24F 11/63* (2018.01)

(56) References Cited

U.S. PATENT DOCUMENTS

| | | |
|---|---|---|
| 4,475,685 A | 10/1984 | Grimado et al. |
| 5,179,556 A | 1/1993 | Turner |
| 5,510,975 A | 4/1996 | Ziegler |
| 5,572,438 A | 11/1996 | Ehlers et al. |
| 5,684,710 A | 11/1997 | Ehlers et al. |
| 5,696,695 A | 12/1997 | Ehlers et al. |
| 5,719,861 A | 2/1998 | Okanoue |
| 5,865,991 A | 2/1999 | Hsu |
| 5,924,486 A | 7/1999 | Ehlers et al. |
| 5,949,976 A | 9/1999 | Chappelle |
| 5,959,529 A | 9/1999 | Kail |
| 6,028,857 A | 2/2000 | Poor |
| 6,092,207 A | 7/2000 | Kolinski et al. |
| 6,178,362 B1 | 1/2001 | Woolard et al. |
| 6,208,247 B1 | 3/2001 | Agre et al. |
| 6,216,956 B1 | 4/2001 | Ehlers et al. |
| 6,498,955 B1 | 12/2002 | Mccarthy et al. |
| 6,631,309 B2 | 10/2003 | Boies et al. |
| 6,640,248 B1 | 10/2003 | Jorgensen |
| 6,680,922 B1 | 1/2004 | Jorgensen |
| 6,684,339 B1 | 1/2004 | Willig |
| 6,754,504 B1 | 6/2004 | Reed |
| 6,785,592 B1 | 8/2004 | Smith et al. |
| 6,859,831 B1 | 2/2005 | Gelvin et al. |
| 6,947,483 B2 | 9/2005 | Engwer |
| 7,058,657 B1 | 6/2006 | Berno |
| 7,062,389 B2 | 6/2006 | Johnson et al. |
| 7,130,719 B2 | 10/2006 | Ehlers et al. |
| 7,171,287 B2 | 1/2007 | Weiss |
| 7,216,021 B2 | 5/2007 | Matsubara et al. |
| 7,245,947 B2 | 7/2007 | Salokannel et al. |
| 7,263,450 B2 | 8/2007 | Hunter |
| 7,266,428 B2 | 9/2007 | Alexanian |
| 7,302,634 B2 | 11/2007 | Lucovsky et al. |
| 7,333,821 B2 | 2/2008 | Willey |
| 7,356,548 B1 | 4/2008 | Culp et al. |
| 7,364,093 B2 | 4/2008 | Garozzo |
| 7,505,852 B2 | 3/2009 | Board |
| 7,539,488 B2 | 5/2009 | Friedman |
| 7,552,033 B1 | 6/2009 | Culp et al. |
| 7,769,611 B1 | 8/2010 | Rodriguez et al. |
| 7,775,454 B2 | 8/2010 | Mueller et al. |
| 7,966,104 B2 | 6/2011 | Srivastava et al. |
| 8,010,240 B2 | 8/2011 | Mattiocco et al. |
| 8,014,905 B2 | 9/2011 | Ehlers |
| 8,121,741 B2 | 2/2012 | Taft et al. |
| 8,175,756 B2 | 5/2012 | Musti et al. |
| 8,176,095 B2 | 5/2012 | Murray et al. |
| 8,239,046 B2 | 8/2012 | Koehler et al. |
| 8,265,776 B2 | 9/2012 | Osann |
| 8,301,921 B2 | 10/2012 | Goodnow et al. |
| 8,332,055 B2 | 12/2012 | Veillette |
| 8,510,255 B2 | 8/2013 | Fadell et al. |
| 8,515,878 B2 | 8/2013 | Radloff et al. |
| 8,543,251 B2 | 9/2013 | Plant |
| 8,549,335 B2 | 10/2013 | Goodnow et al. |
| 8,554,376 B1 | 10/2013 | Matsuoka et al. |
| 8,560,128 B2 | 10/2013 | Satterthwaite et al. |
| 8,583,531 B2 | 11/2013 | Hirl |
| 8,630,742 B1 | 1/2014 | Stefanski et al. |
| 8,674,843 B2 | 3/2014 | Bhageria et al. |
| 8,730,057 B2 | 5/2014 | Dalla |
| 8,761,945 B2 | 6/2014 | Hadzidedic |
| 8,872,667 B2 | 10/2014 | Bhageria et al. |
| 8,892,264 B2 | 11/2014 | Steven et al. |
| 8,977,404 B2 | 3/2015 | Benes et al. |
| 9,003,343 B2 | 4/2015 | Zhou et al. |
| 9,007,077 B2 | 4/2015 | El-Essawy et al. |
| 9,026,261 B2 | 5/2015 | Bukhin et al. |
| 9,244,446 B2 | 1/2016 | Bhageria et al. |
| 9,256,908 B2 | 2/2016 | Dai et al. |
| 9,298,197 B2 | 3/2016 | Matsuoka et al. |
| 9,310,815 B2 | 4/2016 | Shiflet |
| 9,329,212 B2 | 5/2016 | Benes et al. |
| 9,423,779 B2 | 8/2016 | Agarwal |
| 9,471,718 B2 | 10/2016 | Bukhin et al. |
| 9,576,472 B2 | 2/2017 | Koch |
| 9,696,055 B1 | 7/2017 | Goodman et al. |
| 9,722,813 B2 | 8/2017 | Benes et al. |
| 9,785,129 B2 | 10/2017 | Bhageria et al. |
| 9,923,416 B2 | 3/2018 | Bhageria et al. |
| 10,007,243 B2 | 6/2018 | Bhageria et al. |
| 10,281,895 B2 | 5/2019 | Agarwal |
| 10,379,508 B2 | 8/2019 | Shiflet |
| 10,678,279 B2 | 6/2020 | Corbin |
| 10,697,662 B2 | 6/2020 | Matsuoka et al. |
| 10,708,077 B2 | 7/2020 | Cui et al. |
| 10,782,666 B2 | 9/2020 | Agarwal |
| 10,866,568 B2 | 12/2020 | Hummon et al. |
| 10,911,256 B2 | 2/2021 | Benes et al. |
| 11,042,141 B2 | 6/2021 | Shiflet |
| 11,149,975 B2 | 10/2021 | Knatchbull-Hugessen et al. |
| 11,327,457 B2 | 5/2022 | Agarwal |
| 11,385,664 B2 | 7/2022 | Corbin |
| 2002/0002636 A1 | 1/2002 | Vange et al. |
| 2002/0071398 A1 | 6/2002 | Moran et al. |
| 2002/0158763 A1 | 10/2002 | Takarada et al. |
| 2003/0069970 A1 | 4/2003 | Kim et al. |
| 2003/0083758 A1 | 5/2003 | Williamson |
| 2003/0190912 A1 | 10/2003 | Jampolsky et al. |
| 2003/0191955 A1 | 10/2003 | Wagner et al. |
| 2003/0216837 A1 | 11/2003 | Reich et al. |
| 2003/0227439 A1 | 12/2003 | Lee et al. |
| 2004/0034684 A1 | 2/2004 | Payne |
| 2004/0117330 A1 | 6/2004 | Ehlers et al. |
| 2004/0133314 A1 | 7/2004 | Ehlers et al. |
| 2004/0138981 A1 | 7/2004 | Ehlers et al. |
| 2004/0139038 A1 | 7/2004 | Ehlers et al. |
| 2004/0249515 A1 | 12/2004 | Johnson et al. |
| 2004/0260411 A1 | 12/2004 | Cannon |
| 2004/0262410 A1 | 12/2004 | Hull |
| 2005/0038571 A1 | 2/2005 | Brickfield et al. |
| 2005/0043829 A1 | 2/2005 | Rossides |
| 2005/0055137 A1 | 3/2005 | Andren et al. |
| 2005/0060107 A1 | 3/2005 | Rodenberg et al. |
| 2005/0095978 A1 | 5/2005 | Blunn et al. |
| 2005/0096060 A1 | 5/2005 | Rajkotia et al. |
| 2005/0096857 A1 | 5/2005 | Hunter |
| 2005/0124358 A1 | 6/2005 | Willey |
| 2005/0125083 A1 | 6/2005 | Kiko |
| 2005/0157723 A1 | 7/2005 | Kim et al. |
| 2005/0171645 A1 | 8/2005 | Oswald et al. |
| 2006/0005046 A1 | 1/2006 | Hars |
| 2006/0143600 A1 | 6/2006 | Cottrell et al. |
| 2006/0200542 A1 | 9/2006 | Willig |
| 2006/0200658 A1 | 9/2006 | Penkethman |
| 2006/0209789 A1 | 9/2006 | Gupta et al. |
| 2006/0276938 A1 | 12/2006 | Miller |
| 2007/0043477 A1 | 2/2007 | Ehlers et al. |
| 2007/0043478 A1 | 2/2007 | Ehlers et al. |
| 2007/0045431 A1 | 3/2007 | Chapman et al. |
| 2007/0097993 A1 | 5/2007 | Bojahra et al. |
| 2007/0173978 A1 | 7/2007 | Fein et al. |
| 2007/0174644 A1 | 7/2007 | Willig |
| 2007/0239317 A1 | 10/2007 | Bogolea et al. |
| 2007/0251461 A1 | 11/2007 | Reichard et al. |
| 2008/0021749 A1 | 1/2008 | Hope |
| 2008/0065816 A1 | 3/2008 | Seo |
| 2008/0076346 A1 | 3/2008 | Ahmed |
| 2008/0129495 A1 | 6/2008 | Hitt |
| 2008/0256445 A1 | 10/2008 | Olch et al. |
| 2008/0263196 A1 | 10/2008 | Kansal et al. |
| 2008/0271123 A1 | 10/2008 | Ollis et al. |
| 2008/0277486 A1 | 11/2008 | Seem et al. |

(56) References Cited

U.S. PATENT DOCUMENTS

| | | |
|---|---|---|
| 2008/0300906 A1 | 12/2008 | Doi et al. |
| 2008/0306985 A1 | 12/2008 | Murray et al. |
| 2009/0007706 A1 | 1/2009 | Hitt et al. |
| 2009/0045256 A1 | 2/2009 | McInerney et al. |
| 2009/0059842 A1 | 3/2009 | Maltseff et al. |
| 2009/0115597 A1 | 5/2009 | Giacalone |
| 2009/0135018 A1 | 5/2009 | Veillette et al. |
| 2009/0135836 A1 | 5/2009 | Veillette |
| 2009/0320012 A1 | 12/2009 | Lee et al. |
| 2010/0010678 A1 | 1/2010 | Dawson et al. |
| 2010/0031324 A1 | 2/2010 | Strich et al. |
| 2010/0042453 A1 | 2/2010 | Scaramellino et al. |
| 2010/0042720 A1 | 2/2010 | Stienhans et al. |
| 2010/0070101 A1 | 3/2010 | Benes et al. |
| 2010/0070102 A1 | 3/2010 | Benes et al. |
| 2010/0097225 A1 | 4/2010 | Petricoin |
| 2010/0100253 A1 | 4/2010 | Fausak et al. |
| 2010/0107112 A1 | 4/2010 | Jennings et al. |
| 2010/0156665 A1 | 6/2010 | Krzyzanowski et al. |
| 2010/0204834 A1 | 8/2010 | Comerford et al. |
| 2010/0289643 A1 | 11/2010 | Trundle et al. |
| 2011/0029341 A1 | 2/2011 | Muse et al. |
| 2011/0032070 A1 | 2/2011 | Bleile |
| 2011/0040785 A1 | 2/2011 | Steenberg et al. |
| 2011/0046805 A1 | 2/2011 | Bedros et al. |
| 2011/0144932 A1 | 6/2011 | Alles |
| 2011/0166710 A1 | 7/2011 | Kordik et al. |
| 2011/0227417 A1 | 9/2011 | Walker |
| 2011/0231320 A1* | 9/2011 | Irving ............... G06Q 30/08 |
| | | 713/300 |
| 2011/0251807 A1 | 10/2011 | Rada et al. |
| 2011/0282808 A1 | 11/2011 | Amram et al. |
| 2011/0289019 A1 | 11/2011 | Radloff et al. |
| 2011/0313964 A1 | 12/2011 | Sanchey Loureda et al. |
| 2012/0029717 A1 | 2/2012 | Cox et al. |
| 2012/0031984 A1 | 2/2012 | Feldmeier et al. |
| 2012/0053740 A1 | 3/2012 | Venkatakrishnan et al. |
| 2012/0065789 A1 | 3/2012 | Scelzi et al. |
| 2012/0079092 A1 | 3/2012 | Woxblom et al. |
| 2012/0101651 A1 | 4/2012 | Haynes |
| 2012/0173456 A1 | 7/2012 | Hirl |
| 2012/0203379 A1 | 8/2012 | Sloo et al. |
| 2012/0246279 A1 | 9/2012 | Zang et al. |
| 2012/0316687 A1 | 12/2012 | Chen et al. |
| 2012/0323637 A1 | 12/2012 | Cushing et al. |
| 2013/0013121 A1 | 1/2013 | Henze et al. |
| 2013/0103207 A1 | 4/2013 | Ruff et al. |
| 2013/0116835 A1 | 5/2013 | Nowel |
| 2013/0151012 A1 | 6/2013 | Shetty et al. |
| 2013/0170481 A1 | 7/2013 | Crawford et al. |
| 2013/0178986 A1 | 7/2013 | Lombard et al. |
| 2013/0314210 A1 | 11/2013 | Schoner et al. |
| 2014/0039690 A1 | 2/2014 | Steinberg |
| 2014/0101082 A1 | 4/2014 | Matsuoka et al. |
| 2014/0222241 A1 | 8/2014 | Ols |
| 2014/0277761 A1 | 9/2014 | Matsuoka et al. |
| 2014/0277765 A1 | 9/2014 | Karimi et al. |
| 2014/0278264 A1 | 9/2014 | Bukhin et al. |
| 2014/0297001 A1 | 10/2014 | Silverman et al. |
| 2014/0309869 A1 | 10/2014 | Ricci |
| 2014/0309892 A1 | 10/2014 | Ricci |
| 2014/0371921 A1 | 12/2014 | Weaver et al. |
| 2014/0379156 A1 | 12/2014 | Kamel et al. |
| 2015/0032264 A1 | 1/2015 | Emmons et al. |
| 2015/0057824 A1 | 2/2015 | Gheerardyn et al. |
| 2015/0100167 A1 | 4/2015 | Sloo et al. |
| 2015/0168002 A1 | 6/2015 | Plitkins et al. |
| 2015/0178421 A1 | 6/2015 | Borrelli et al. |
| 2015/0178865 A1 | 6/2015 | Anderson et al. |
| 2015/0198346 A1 | 7/2015 | Vedpathak |
| 2015/0248118 A1 | 9/2015 | Li et al. |
| 2015/0277409 A1 | 10/2015 | Yamada |
| 2015/0369847 A1 | 12/2015 | Roosli |
| 2016/0088438 A1 | 3/2016 | Okeeffe |
| 2016/0131388 A1 | 5/2016 | Eiynk et al. |
| 2016/0201934 A1 | 7/2016 | Hester et al. |
| 2016/0223214 A1 | 8/2016 | Turner et al. |
| 2016/0313751 A1 | 10/2016 | Risbeck et al. |
| 2017/0055126 A1 | 2/2017 | O'Keeffe |
| 2017/0123440 A1 | 5/2017 | Mangsuli et al. |
| 2017/0191695 A1 | 7/2017 | Bruhn et al. |
| 2017/0288401 A1 | 10/2017 | Hummon et al. |
| 2018/0010818 A1 | 1/2018 | Maruyama et al. |
| 2018/0136621 A1 | 5/2018 | Buda et al. |
| 2019/0242608 A1 | 8/2019 | Laftchiev et al. |
| 2019/0264942 A1 | 8/2019 | Cheng et al. |
| 2019/0338974 A1 | 11/2019 | Turney et al. |
| 2020/0393860 A1 | 12/2020 | Corbin |
| 2021/0241125 A1 | 8/2021 | Jost et al. |
| 2021/0294283 A1 | 9/2021 | Hummon et al. |
| 2021/0404691 A1 | 12/2021 | Sakata et al. |
| 2022/0035329 A1 | 2/2022 | Shiflet |
| 2022/0170655 A1 | 6/2022 | Knatchbull-Hugessen et al. |
| 2022/0373990 A1 | 11/2022 | Agarwal |

OTHER PUBLICATIONS

An, Lianjun et al. "An inverse PDE-ODE model for studying building energy demand." Proceedings of the 2013 Winter Simulation Conference, Dec. 8, 2013, pp. 1869-1880.
De Angelis et al. Optimal Home Energy Management Under Dynamic Electrical and Thermal Constraints, IEEE Transactions on Industrial Informatics; vol. 9, Iss. 3; 1518-1527, 2012, 12 pages.
European Patent Office, Extended European Search Report, EP Patent Application 17776874.4, dated Nov. 13, 2019, 13 pages.
International Search Report and Written Opinion dated Jun. 21, 2017, for International Patent Application No. PCT/US2017/025606, 53 pages.
International Searching Authority, International Search Report and Written Opinion, PCT Patent Application PCT/US2020/043149, dated Sep. 28, 2020, 11 pages.
Vakiloroaya et al. A review of different strategies for HVAC energy saving. Energy, Conversion and Management; vol. 77; 735-754, 2014, 19 pages.
Builis, Kevin, "Dumb Meters Get Smarter," <http://www.technologyreview.com/energy/22366>, Mar. 31, 2009, 2 pages.
Dave's Tech Blog, "Itron Remote Read Electric Meter," <http://davestech.blogspot.com/2008/02/itron-remote-read-electric-meter.html>, internet accessed on Nov. 8, 2010, 22 pages.
Doebber, I. "Investigation of Concrete Wall Systems for Reducing Heating and Cooling Requirements in Single Family Residences" [online], Sep. 2004 [retrieved on Mar. 9, 2014]. Retrieved from the Internet:<URL: http://scholar.lib.vt.edu/theses/available/.
ECONorthwest, "Process Evaluation of the SCE Aug. 2006 Home Energy Efficiency Survey (HEES) Program," Aug. 2009. <URL: http://www.calmac.org/publications/SCE_HEES_Final_Report_080400_caimac_edit.pdf> entire document Aug. 4, 2009.
Extended European Search Report; European Patent Application No. 13824847.1; dated Jun. 7, 2016; 7 pages.
European Patent Office, Examination Report, EP Patent Application 17776874.4, dated Nov. 12, 2021, 10 pages.
Hancock, Gregory, "Power monitoring to the people!" <http://www.gridinsight.com/2009/02/power-monitoring-to-the-people.html>, Feb. 25, 2009, 4 pages.
http://blog.microsoft-hohm.com/Hohm-energy-report-sample.aspx. accessed on Aug. 9, 2010.
http://efficiency20.com/, accessed on Aug. 9, 2010.
http://hes.lbl.gov/consumer, accessed on Aug. 9, 2010.
http://onzo.com/solutions/, accessed on Aug. 9, 2010.
http://silverspringnetworks.com/products/index.html, accessed on Aug. 9, 2010.
http://www.agilewaves.com/, accessed on Aug. 9, 2010.
http://www.alertme.com/, accessed on Aug. 9, 2010.
http://www.ambientdevices.com/products/energyjoule.htmi, accessed on Aug. 9, 2010.
http://www.bluelineinnovations.com, accessed on Aug. 9, 2010.
http://www.consert.com/, accessed on Aug. 9, 2010.
http://www.diykyoto.com/, accessed on Aug. 9, 2010.
http://www.energy-aware.com/, accessed on Aug. 9, 2010.

(56) References Cited

OTHER PUBLICATIONS http://www.energyhub.net, accessed on Aug. 9, 2010.
http://www.google.com/powermeter/about/, accessed on Aug. 9, 2010.
http://www.greenenergyoptions.co.uk/, accessed on Aug. 9, 2010.
http://www.lem.com/hq/en/content/view/276/215/, accessed on Aug. 9, 2010.
http://www.opower.com/Products/Overview.aspx, accessed on Aug. 9, 2010.
http://www.powermand.com/dreamwatts-product, accessed on Aug. 9, 2010.
http://www.tendrilinc.com/products/vision/, accessed on Aug. 9, 2010.
http://www.theenergydetective.com/home, accessed on Aug. 9, 2010.
http://www.theowl.com/, accessed on Aug. 9, 2010.
International Preliminary Report on Patentability and Written Opinion; International Patent Application No. PCT/US2013/053317; Applicant Tendril Networks, Inc.; dated Feb. 12, 2015; 8 Pages.
International Search Report and Written Opinion; International Application No. PCT/US2011/061470; dated Apr. 9, 2014; 9 pages.
James Broberg, Rajkumar Buyya, Zhair Tari; MetaCDN: Harnessing 'Storage Clouds' for high performance content delivery; online publication date; Apr. 5, 2009: http://www.sciencedirect.com/science/article/pii/S1084804509000514.
Kennedy, James and Russell Eberhart. "Particle Swarm Optimization," Proceedings of the IEEE International Conference on Neural Networks (Perth, Australia), 1995, pp. 1942-1948.
Retzlaff et al. Conservation & Energy Potential Study for Smith River Rancheria:, Smith River Rancheria, Evergreen NRG/Strategic Energy Solutions. Aug. 2005, 417 pages.
U.S. Appl. No. 61/446,233; Inventor: Henze; filed Feb. 24, 2011, 17 pages.
WIPO International Search Report and Written Opinion, PCT/US2014/029643, dated Sep. 19, 2014, 12 Pages.
EPO, Extended European Search Report, EP Patent Application 20844598.1, dated Jul. 19, 2023, 8 pages.

\* cited by examiner

OPTIMIZATION OF ENERGY USE THROUGH MODEL-BASED SIMULATIONS

This application is a continuation of U.S. patent application Ser. No. 16/894,508, titled METHODS AND APPARATUS FOR ACHIEVING ENERGY CONSUMPTION GOALS THROUGH MODEL-BASED SIMULATIONS, filed Jun. 5, 2020, which is a continuation of U.S. patent application Ser. No. 13/564,623, titled OPTIMIZATION OF ENERGY USE THROUGH MODEL-BASED SIMULATIONS, filed Aug. 1, 2012, both of which are incorporated herein in their entirety by reference thereto.

TECHNICAL FIELD

The present disclosure is directed to optimization of energy usage based on users goals and preferences, and more particularly to optimization of energy usage using model-based simulations.

BACKGROUND

As non-renewable energy resources are being depleted and energy costs become increasingly more expensive and volatile, consumers continue to seek out ways to reduce their energy consumption and energy costs. Many energy systems (e.g., energy-consuming or energy-producing systems) allow users to establish automated schedules that dictate how and when the energy systems should be used. For example, a heating and cooling system may allow a user to set temperatures for different times of day, such as a "wake" time and temperature, an "away" time and temperature, a "return" time and temperature, and a "sleep" time and temperature. At the predetermined times the system adjusts to the predetermined temperatures. However, these systems require a user to both configure them properly and, more importantly, adjust the times and temperatures to adapt to changing needs and concerns with respect to energy consumption or production. These systems do not take into account the amount of energy used, or the cost of the energy used. An intelligent system for adapting to changing energy costs and energy needs while achieving user goals with respect to energy consumption or production and costs is desired.

DETAILED DESCRIPTION

Figure 1:
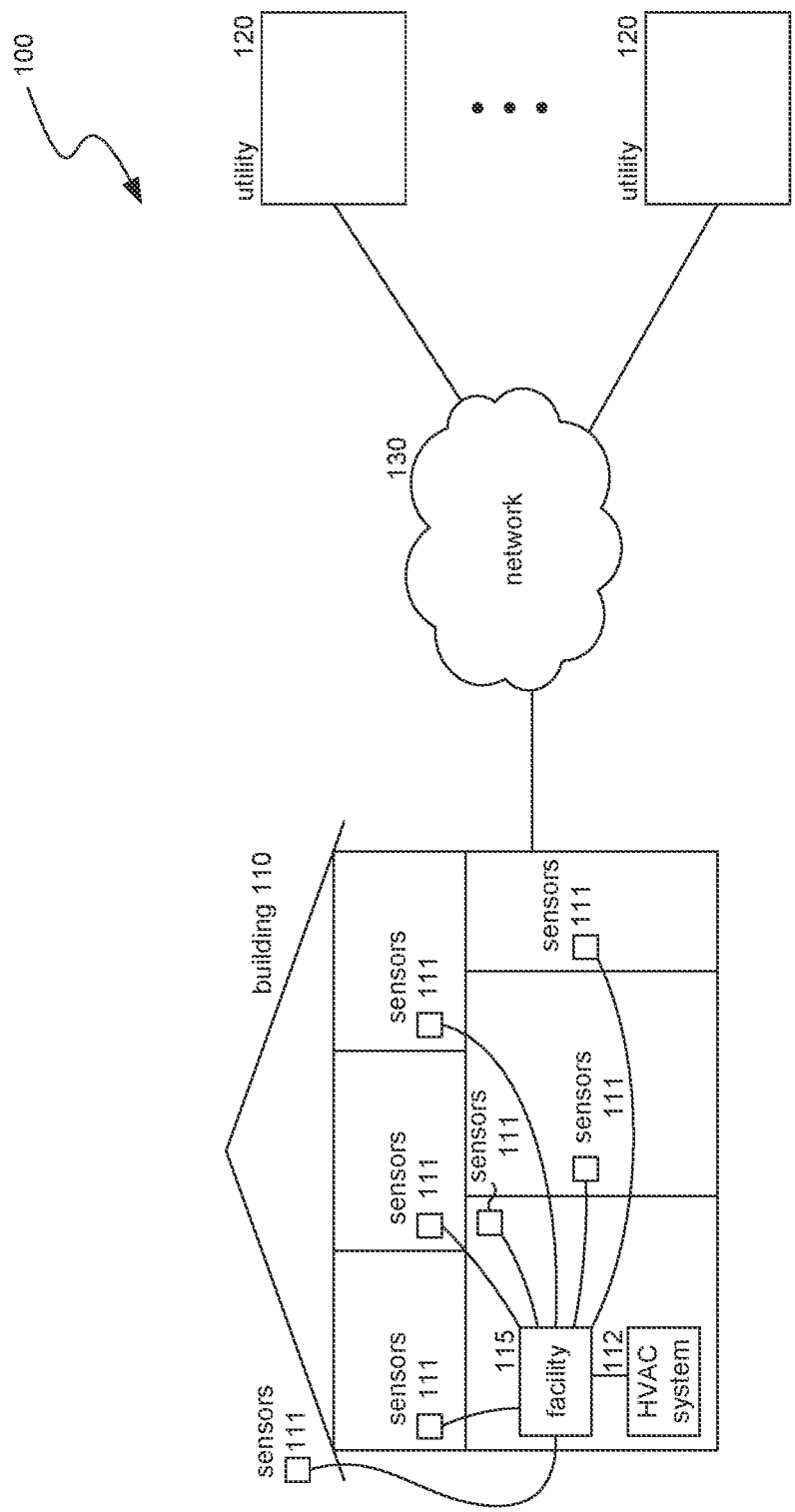
FIG. 1 is a block diagram illustrating an environment in which the facility may operate.

A facility implementing systems and/or methods for achieving energy consumption or production and cost goals is described. The facility identifies various components of an energy system, such as a heating, ventilation, and air condition (HVAC) system, load-control switch, hot water heater, electric vehicle, electric appliance, solar system, etc. and assesses the environment in which those components operate, such as the thermal capacitance of a building in which a HVAC system operates, current and forecasted weather conditions, and energy costs. Based on the identified components and assessments, the facility generates a simulation model that can be used to simulate different time-based series or schedules of adjustments to the energy system and how those adjustments will effect energy consumption. For example, the facility may use the simulation model to calculate the amount of energy consumed or the cost of the energy consumed for different heating/cooling schedules for an HVAC system. Based on user patterns and preferences (e.g., when users consume energy, whether a user desires to reduce energy costs and/or energy consumption, when users prefer certain appliances to operate), the facility can identify an optimal series or schedule of adjustments for the user and provide the schedule to the system for implementation. As another example, the facility may use the simulation model to calculate the amount of energy produced or the value of the energy produced. Additionally, the facility can configure the system to operate in accordance with a demand profile received from a utility.

For example, the simulations may show that "heating/cooling schedule A" causes the HVAC system to consume 50 kilowatt hours (kWh) of energy per day at an average cost of 50¢ per kWh ($2.50 per day) while heating/cooling schedule B causes the HVAC system to consume 60 kWh per day at an average cost of 40 per kWh ($2.40 per day). Accordingly, a user looking to reduce energy costs may choose schedule B while a user looking to reduce energy consumption may choose schedule A. In this manner, the facility can optimize the HVAC system to achieve user goals with respect to energy use. As another example, a utility may provide a demand schedule and encourage users to implement the schedule to receive discounts or other compensation. The facility can, using the demand schedule, configure the system to comply with the energy consumption preferences of the utility.

In some embodiments, the facility operates in a learning mode to identify components of an energy system. When working in conjunction with an HVAC system, for example, the facility may query a thermostat and/or other components to identify the different components in the system, such as air-conditioning units, sensors, photovoltaic systems (e.g., roof-mounted photovoltaic systems), fans, pumps, etc. In other examples, the facility may provide a user interface through which a user can manually identify the various components in the system. As another example, when working in conjunction with an electric vehicle, the facility may identify the electric vehicle and its battery.

In addition to identifying components while in the learning mode, the facility may also perform tests to identify attributes of the energy system and the environment in which the system operates. For example, the facility may perform a number of tests on an HVAC system, such as a heating step test, a free-float test, and a cooling step test while monitoring different areas (e.g., rooms) of the surrounding environment to determine where and how fast the various areas acquire or lose heat. Based on the information collected during the monitoring phase, the facility can employ system identification techniques, such as those described in *Applied System Identification* by Jer-Nan Juang (Prentice Hall, 1994), which is herein incorporated by reference, to determine attributes of the energy system and environment, such as an envelope resistance, thermal capacitance, thermal resistance, and heating capacity of a building in which the HVAC system operates. One skilled in the art will understand that the facility may determine additional attributes of the environment, such as occupancy schedule, internal gains, the schedule of internal gains, window area, window properties, wall/roof/floor area, wall/roof/floor insulation, wall/roof/floor thermal capacitance, wall/roof/floor thermal state (temperature) heating and cooling set points and their schedule, heating equipment efficiency, fan energy consumption, cooling equipment efficiency, infiltration, exterior shading, photovoltaic system efficiency, photovoltaic system orientation, electric vehicle capacity, electric vehicle charging rate, electric vehicle state of charge, appliance energy consumption, appliance schedule, and so on. The facility may also determine ranges of operating conditions for various components of the energy system, such as the available settings for each fan, blower, vent, heating unit, cooling unit, etc. and the amount of energy that the system and each component of the system consumes while in use, such as how much energy an HVAC system and/or an air conditioner consume while cooling a building from one temperature set point to another temperature set point or how much energy the HVAC system, central heating unit, fans, blowers, etc. consume while heating from one set point to another. As another example, the facility may perform a number of tests and measurements on the battery of an electric vehicle to determine the battery's charge capacity, the battery's charge rate, etc.

In some embodiments, the facility determines patterns and preferences of individuals who interact with the environment, such as when residents of a home awake or return home from work, when employees of a business arrive and leave for work, the preferred temperature conditions during various stages, etc., and retrieves information about external conditions that may impact the use of the energy system, such as weather conditions/forecasts and energy pricing information. The facility may determine these patterns by monitoring sensors and/or components distributed through the system and surrounding environment or receiving direct input from a user.

In some embodiments, the facility generates a simulation model for the energy system and surrounding environment based on the attributes identified while in learning mode. The simulation model specifies the amount of energy used by the energy system to transition between various states—such as transitions between different thermostat set points, change levels, etc.—using different components of the energy system under different operating conditions. For example, an HVAC system may be configurable to heat a building using a different combination of components (e.g., fans and blowers) and different settings for those components, such as operating a central heating unit and/or blower at full capacity while heating a building, operating the central heating unit at 50% while operating fans and blowers at 75%, and so on, each combination of settings offering different levels of energy consumption. In addition to (or alternatively to) the combinations of components and settings described herein, different combinations of components and settings can be used during the process of generating a simulation model.

Using the simulation model and the determined user preferences, the facility can simulate a number of different schedules for the energy system, each schedule specifying times for transitioning components of the energy system between states and operating conditions, such as a time to turn on a central heating unit and an operating level (e.g., full capacity, 25%, 75%) for the central heating unit while heating a building before individuals (e.g., residents, employees, or customers) arrive/depart. In some examples, the facility performs an optimization technique on the simulation model (e.g., a meta-heuristic optimization technique, the Particle Swarm Optimization technique described by J. Kennedy and R. Eberhart in Particle Swarm Optimization (Proc. IEEE International Conf. on Neural Networks (Perth, Australia), IEEE Service Center, Piscataway, N.J., 1995), which is herein incorporated by reference), to identify an optimal schedule. During the simulations, the facility may employ user preferences, such as minimum and maximum temperatures or minimum and maximum energy consumption levels, as limits for acceptable schedules to prevent the system from operating under conditions that a user would find unacceptable. After performing the simulations, the facility can determine, for each simulated schedule, both 1) the amount of energy consumed by the energy system if the schedule were to be implemented and 2) if energy pricing information is known to the facility, the cost of implementing the schedule. Based on user preferences, the facility can choose a schedule for implementation, such as the schedule with the lowest cost or energy consumption. Additionally, the facility can choose a schedule for implementation that best satisfies a utility objective (e.g., demand reduction) with no adverse impact to the user(s).

FIG. 1 is a block diagram illustrating an environment in which the facility may operate in some embodiments. The environment 100 includes building 110, HVAC system 112, facility 115, and a plurality of sensor sets 111. Building 110 may represent any type of building, such as a house, office building, stadium, apartment complex, etc. Sensor sets 111, which communicate with the facility, may include any number and type of sensor for detecting and measuring operating and environmental conditions, such as thermostats, thermometers, motion detectors, windows or door sensors (e.g., sensors to detect whether windows and doors are open), sensors for detecting fan/blower speed, central heating unit settings, occupancy sensors, sensors measuring site-generated energy production, audio/video recording devices, etc. Although in this example each area of building 110 includes a set of sensors, one skilled in the art will recognize that the facility may be used in an environment with any number of sensors and/or areas with sensors. HVAC system 112 represents the heating and cooling system of building 110 and includes, for example, heating components (not shown), cooling components (not shown), conduit (not shown), vents (not shown), etc. used for heating and cooling building 110. Environment 100 also includes utilities 120, which provide energy services (e.g., electricity), weather information, and other utility services to building 110. In some examples, the facility may also download information from the utilities pertaining to energy costs information, such as cost schedules (e.g., how much energy costs per unit at different times of the day, month, year) or demand schedules that indicate the utility's preferred energy consumption levels at various times of the day, month, year, etc. Building 110 and facility 115 may communicate with utilities 120 via network 130. Although the facility is shown in conjunction with an HVAC system in this example, one skilled in the art will understand that the techniques described herein can be used to detect and determine various attributes of any energy system, such as a dishwasher, washer, dryer, electric vehicle (and/or charger), solar panel systems, etc., or any combination thereof, and optimize the energy consumption of these systems.

Figure 2:
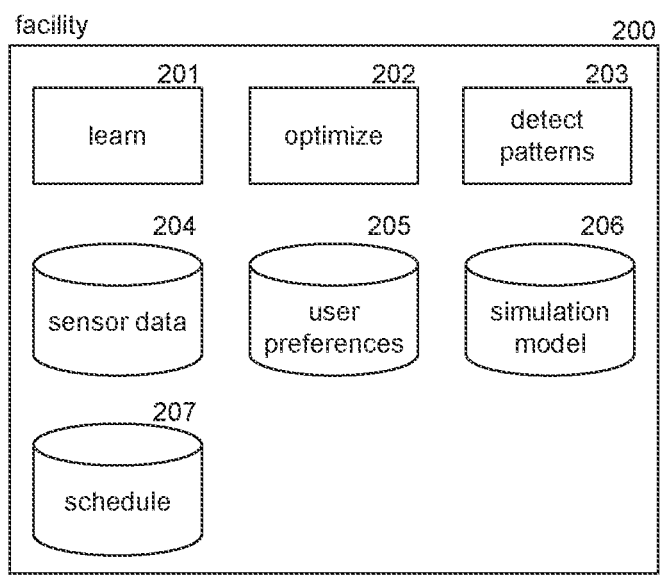
FIG. 2 is a block diagram illustrating components of the facility.

FIG. 2 is a block diagram illustrating components of the facility in some embodiments. In this example, facility 200 includes learn module 201, optimize module 202, detect patterns module 203, sensor data store 204, user preferences store 205, simulation model store 206, and schedule store 207. Learn module 201 is invoked by the facility to detect and determine information about an associated energy system and the environment in which the system operates. Optimize module 202 is invoked by the facility to optimize an energy system based on attributes of the system, environment, and user preferences. Detect patterns module 203 is invoked by the facility to detect patterns of individuals who interact with the system, such as when and where the individuals interact with the system (e.g., which rooms the individuals occupy, when windows are open, when and how thermostats in various rooms are adjusted) and patterns of the system and surrounding environment (e.g., when people arrive/depart, weather patterns). Sensor data store 204 stores information collected from each of the various sensor sets, such as data about the temperature of a room over time, the presence of individuals within those rooms, when and how various components of the system are adjusted, etc.

User preferences store 205 stores user preferences, such as preferred temperature settings (which may be time-based if a user prefers different temperatures based on the time of day, month, or year), preferred energy consumption goals (e.g., a preference to reduce consumption or costs), etc. Simulation model store 206 stores attributes of a simulation model generated based on attributes of an energy system and the surrounding environment. Schedule store 207 stores schedules for the system, such as the schedule that optimizes the system for a user's preferences. This schedule can be provided to the system to facilitate implementation of the user preferences.

The computing devices on which the disclosed facility is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the technology, which means a computer-readable medium that contains the instructions. In addition, the instructions, data structures, and message structures may be stored or transmitted via a data transmission medium, such as a signal on a communications link and may be encrypted. Various communications links may be used, such as the Internet, a local area network, a wide area network, a point-to-point dial-up connection, a cell phone network, and so on.

The disclosed facility may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Many embodiments of the technology described herein may take the form of computer-executable instructions, including routines executed by a programmable computer. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the technology.

Figure 3:
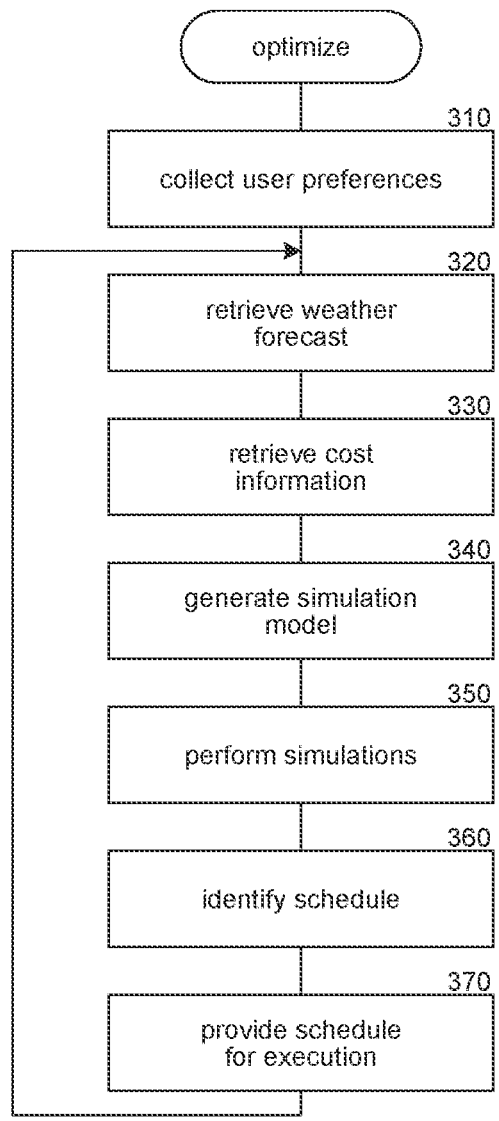
FIG. 3 is a block diagram illustrating the processing of an optimize module of the facility.

FIG. 3 is a block diagram illustrating the processing of an optimize module in some embodiments. The optimize module is invoked by the facility to optimize an energy system based on attributes of the system, environment, and user preferences. In block 310, the facility collects user preferences. For example, the module may retrieve input, such as thermostat settings and related scheduling information, to determine a user's preferred temperature setting at various times of the day. In some cases, the module may retrieve this information by querying one or more modules of the system, such as thermostats placed throughout a building. In some cases, the facility may provide a user interface through which a user may enter their preferences. Additionally, a user may specify their preferred energy consumption goals, such as reducing consumption, reducing costs, or some combination thereof.

In block 320, the facility retrieves a weather forecast, which may include forecasted temperatures and weather conditions for a predetermined number of hours, days, etc. In block 330, the module retrieves current and/or forecasted energy cost information (e.g., a cost schedule indicating a flat rate of 7.5¢ per kWh, a cost schedule indicating 5¢ per kWh for the first 10 kWh per day and 10¢ for each additional kWh per day, a cost schedule indicating various prices for each hour, or a range of times, of the day). In block 340, the module generates a simulation model based on the attributes detected and determined while in the learning mode. In block 350, the module performs simulations based on the generated simulation model, each simulation providing a schedule and estimated energy consumption over the course of the schedule.

In block 360, the module identifies the schedule with the preferred energy consumption (e.g., the schedule resulting in the lowest cost based on the retrieved cost information or the schedule resulting in the lowest overall consumption of energy). For example, the schedule may specify that a central heating unit of an HVAC system is to be turned on at 80% of capacity at 6:00 am with blowers operating at 75% and then turned off at 8:00 pm and then turned on again at 70% capacity at 4:45 pm before being turned off at 11:00 pm. In block 370, the facility provides the identified schedule to the system for implementation and then loops back to block 320. For example, the facility may communicate a schedule of set points to a thermostat for implementation. In some embodiments, the optimize process occurs frequently throughout the day to incorporate new and/or changed information into the optimization, such as occupant overrides, updated forecasts (e.g., weather and cost), schedule changes, etc. Furthermore, this process may occur on demand according to information provided by an energy provider, such as demand response events.

Figure 4:
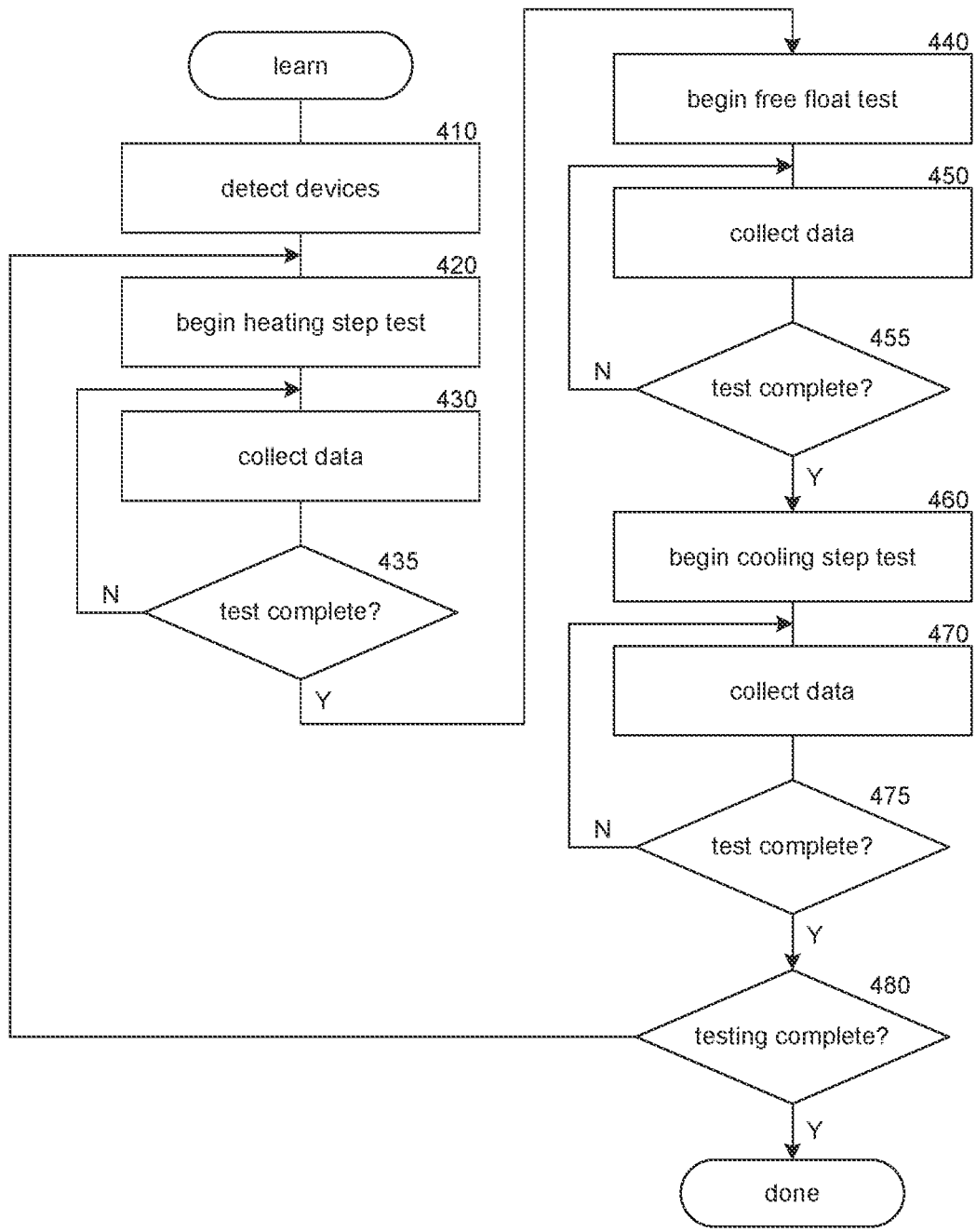
FIG. 4 is a block diagram illustrating the processing of a learn module of the facility.

FIG. 4 is a block diagram illustrating the processing of a learn module in some embodiments. The facility invokes the learn module to detect and determine various attributes of the associated energy system. In this example, the module is invoked to determine and detect the attributes of heating and cooling system, such as an HVAC system. In block 410, the learn module identifies devices and components of the system by, for example, querying the system to provide this information, receiving manual input from a user, or performing know system identification techniques. In block 420, the learn module performs a heating step test by heating up the building in which the HVAC system operates and monitoring various conditions of the system and surrounding environment.

In block 430, the learn module collects data to assess how the system and environment changes during the heating step test, such as the rate at which the environment heats up (i.e. stores and retains heat), and that can be used to determine attributes of the system and environment. The heating step test may include, for example, heating the environment at one degree (or more) increments at a time based on the temperature measured at a predetermined location and collecting data from each of the sensors as the environment heats, including an indication of the amount of energy consumed by the system as the environment transitions between temperatures. In some cases, the learn module may perform the heating step test multiple times using different operating configurations (e.g., different operating levels—such as 0% to 100%—for a central heating unit, fans, blowers, vents, etc.) or under different operating conditions. In decision block 435, if the heating step test is complete then the learn module continues at block 440, else the module loops back to block 430 to collect additional data generated during the heating step test.

In block 440, the learn module performs a free float test. During the free float test, the facility turns off the HVAC system to monitor how the environment retains, loses, or gains heat without input from the HVAC system. In block 450, the learn module collects data from the available sensors to assess how the system and environment changes during the free float step test and that can be used to determine attributes of the system and environment. In decision block 455, if the free float test is complete, then the learn module continues at block 460, else the module loops back to block 450 to collect additional data generated during the free float test.

In block 460, the module performs a cooling step test to collect data while cooling down the environment. In block 470, the learn module collects data to assess how the system and environment changes during the cooling step test, such as the rate at which the environment cools down and where heat is lost, and that can be used to determine attributes of the system and environment. The cooling step test may include, for example, cooling the environment at one degree (or more) increments, based on, for example, the temperature measured at a predetermined location and collecting data from each of the sensors as the environment cools, including an indication of the amount of energy consumed by the system as the environment transitions between temperatures. In some cases, the learn module may perform the cooling test multiple times using different operating configurations (e.g., different operating levels—such as 0% to 100%—for an air conditioner, fans, blowers, vents, etc.) or under different operating conditions. In decision block 475, if the cooling step test is complete, then the module continues at decision block 480, else the module loops back to block 470 to collect additional data generated during the cooling step test. In decision block 480, if testing is complete then the learn module terminates processing, else the module loops back to block 420 to continue testing.

Figure 5:
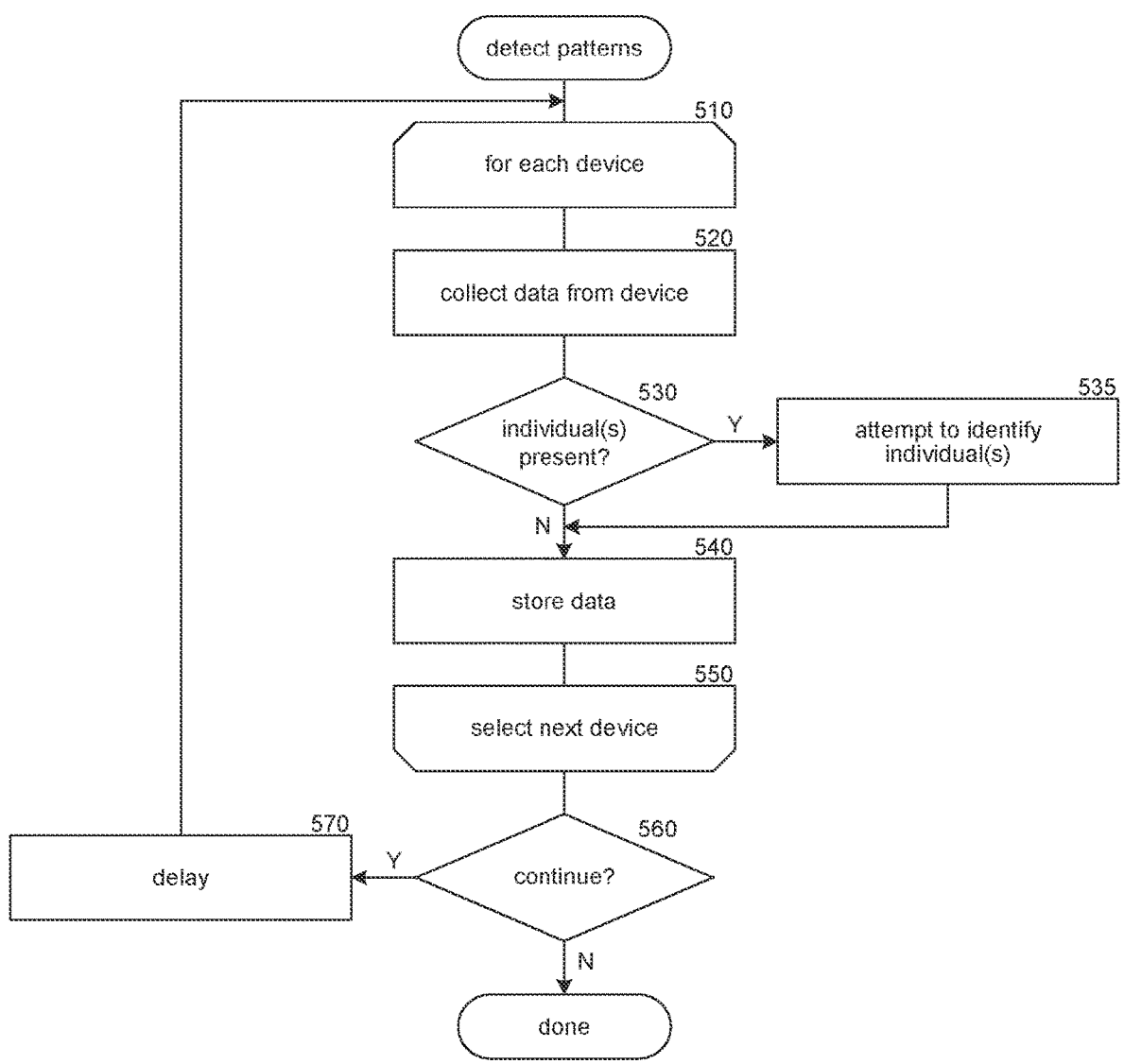
FIG. 5 is a block diagram illustrating the processing of a detect patterns module of the facility.

FIG. 5 is a block diagram illustrating the processing of a detect patterns module in some embodiments. The facility invokes the detect patterns module to detect a) patterns of individuals who interact with the system, such as when and where the individuals interact with the system, and b) patterns of the system and surrounding environment. The facility may invoke the module periodically (e.g., once per hour, once per day, once per week, once per month), upon request from a user, and/or in response to changes to the system, such as an adjustment to a thermostat or a modified schedule. In blocks 510-545 the detect patterns module loops through each of the devices available to the module to collect information from those devices. The devices may include, for example, sensors, appliances, thermostats, HVAC components, electric vehicles, and so on.

In block 520, the detect patterns module collects data from the device, such as its current operating condition, current configuration, and so on. In decision block 530, if the detect patterns module determines that one or more individuals are present in the vicinity of the device (e.g., based on data collected from a presence or proximity sensor) then the module continues at block 535, else the module continues at block 540. In block 535, the detect patterns module attempts to identify the individual(s) using, for example, an object carried by an individual, such as an RFID tag, voice or face recognition techniques if audio or video data is available, and so on. In this manner, the facility can associate different individuals with preferred settings. For example, if the facility determines that a thermostat is regularly adjusted to 68 degrees when a particular individual enters a room, the facility may associate the particular individual with a preferred temperature of 68 degrees. Furthermore, by detecting individuals the module allows the facility to detect patterns among individuals with respect to their interactions with the system, such as when they arrive and leave.

In block 540, the detect patterns module stores the data collected from the device, time information (e.g., a time stamp), and an indication of the presence of any individual. In block 550, if there are additional devices from which data has not been collected, then the detect patterns module selects the next device and loops back to block 510. In decision block 560, if the module is to continue checking devices, then the module continues at block 570, else processing of the module completes. In block 570, the detect patterns module waits a predetermined period of time (e.g., 1 milliseconds, 1 hour, 24 hours, 7 days, a month) and then loops back to block 510 to continue processing data from the devices.

From the foregoing, it will be appreciated that specific embodiments of the technology have been described herein for purposes of illustration, but that various modifications may be made without deviating from the disclosure. The facility can include additional components or features, and/or different combinations of the components or features described herein. Additionally, while advantages associated with certain embodiments of the new technology have been described in the context of those embodiments, other embodiments may also exhibit such advantages, and not all embodiments need necessarily exhibit such advantages to fall within the scope of the technology. For example, the facility may operate in conduction with an energy-producing system Accordingly, the disclosure and associated technology can encompass other embodiments not expressly shown or described herein.

I claim:

1. A system, having a processor, for controlling a heating, ventilation, and air condition (HVAC) system to meet energy consumption goals, the system comprising:
   a component configured to perform a test on a set of appliances in the HVAC system, wherein performing the test comprises:
      operating the set of appliances to heat an environment thermally coupled to the HVAC system;
      controlling the set of appliances to idle and allow the environment to free float without input from the HVAC system; and
      operating the set of appliances to cool the environment;
   a component configured to control one or more sensors to monitor conditions of the set of appliances and the environment while the test is being performed;
   a component configured to generate a simulation model of the set of appliances based on the monitored conditions, wherein the simulation model relates an amount of energy consumed by the set of appliances in the HVAC system while transitioning the environment between a plurality of states;
   a component configured to generate a plurality of schedules of adjustments applicable to the set of appliances;
   a component configured to, for each of the generated plurality of schedules of adjustments, simulate the effect of the schedules of adjustments on a measure of energy consumption based on the generated simulation model; and
   a component configured to facilitate implementation of at least one of the schedules of adjustments by controlling operation of the set of appliances according to the schedule of adjustments.

2. The system of claim 1, wherein:
   the monitored conditions further include weather around the environment thermally coupled to the HVAC system;
   the system further comprises a component configured to retrieve a weather forecast;
   the simulation model is further based on the effect of the weather on the environment during the test; and
   the simulated effects are further based on an input of the retrieved weather forecast into the simulation model.

3. The system of claim 1, further comprising a component configured to retrieve user preferences, wherein the plurality of schedules are based at least partially on the retrieved user preferences to control a temperature in the environment based on the retrieved user preferences.

4. The system of claim 1 wherein generating the simulation model includes determining, based on the monitored conditions, an envelope resistance of the environment, a thermal capacitance of the environment, a thermal resistance of the environment, and a heating capacity of the environment.

5. The system of claim 1, further comprising a component configured to obtain utilities information from an external source, wherein the utilities information includes current and/or expected energy cost information, and wherein the plurality of schedules are based at least partially on the current and/or expected energy cost information.

6. The system of claim 1, further comprising a component configured to obtain expected costs for operating the set of appliances in the HVAC system according to each of the plurality of schedules.

7. The system of claim 6, further comprising a component configured to select an optimal schedule from the plurality of schedules based at least partially on the simulated effects and the expected costs, wherein the component configured to facilitate implementation uses the optimal schedule.

8. The system of claim 7, further comprising a component configured to obtain one or more user preferences for the environment, and wherein select the optimal schedule from the plurality of schedules is further based on the one or more user preferences.

9. The system of claim 1, further comprising a component configured to obtain user preferences for each of a plurality of users identified in the environment, wherein the plurality of schedules is based at least partially on the obtained user preferences.

10. The system of claim 9 wherein the obtained user preferences are based at least in part on past user inputs adjusting operation of the HVAC system.

11. The system of claim 1, further comprising a component configured to:
   detect, using a presence sensor, one or more users in the environment; and
   for each user detected in the environment:
      receive a user identity associated with the user; and
      obtain one or more user preferences based on the user identity,
   wherein the plurality of schedules is based at least partially on the obtained user preferences for each of the detected users.

* * * * *